US009911303B2

(12) United States Patent
Vaucher et al.

(10) Patent No.: US 9,911,303 B2
(45) Date of Patent: Mar. 6, 2018

(54) SYSTEM TO EVALUATE AIRBORNE HAZARDS

(75) Inventors: Gail Vaucher, Las Cruces, NM (US); Robert O. Brice, Las Cruces, NM (US); Saba A. Lucas, Las Cruces, NM (US); Sean G. O'Brien, Las Cruces, NM (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 602 days.

(21) Appl. No.: 13/452,047

(22) Filed: Apr. 20, 2012

(65) Prior Publication Data

US 2013/0282284 A1 Oct. 24, 2013

(51) Int. Cl.
*G06F 19/00* (2011.01)
*G08B 21/14* (2006.01)
*G08B 31/00* (2006.01)

(52) U.S. Cl.
CPC ............. *G08B 21/14* (2013.01); *G08B 31/00* (2013.01)

(58) Field of Classification Search
CPC ...... G08B 21/12; G08B 25/009; G08B 29/06; G08B 29/188; H04M 11/002; Y10T 436/15; H04L 67/12
USPC .............. 702/3, 24, 187; 356/28.5; 340/506; 703/6
See application file for complete search history.

(56) References Cited

U.S. PATENT DOCUMENTS 7,184,896 B1 * 2/2007 Benson ............................ 702/24
7,834,754 B2 * 11/2010 Kulesz ................... G08B 21/12 340/3.1
2004/0189976 A1 * 9/2004 Burns et al. ................. 356/28.5

* cited by examiner

*Primary Examiner* — John H Le
(74) *Attorney, Agent, or Firm* — Alan I. Kalb

(57) ABSTRACT

A system to evaluate airborne hazards having at least one sensor module which detects atmospheric conditions and generates output signals representative of those atmospheric conditions. A model module receives the output from the sensor and generates a model output signal representative of a calculated wind flow and plume footprint, when applicable, over an area of interest. A display module receives the model output signal and visually displays the calculated wind flow and its effect on a plume if present in near real-time. The final system output is provided to authorized end users in near real-time.

1 Claim, 4 Drawing Sheets

SYSTEM TO EVALUATE AIRBORNE HAZARDS

GOVERNMENT INTEREST

The invention described herein may be manufactured, used, and licensed by or for the United States Government.

BACKGROUND OF THE INVENTION

I. Field of the Invention

The present invention relates generally to a system to rapidly evaluate, predict, and display the spread of airborne hazards in an emergency situation, or any application requiring a near real-time wind field display.

II. Description of Related Art

In emergency situations involving the release of airborne hazards, there are many levels of decisions that must be made in order to protect soldiers and/or civilians from those airborne hazards. In order to take the appropriate action, e.g. an evacuation of personnel, it is necessary to know, or at least estimate, the range and rate of spread of the airborne hazard over the area of interest.

There have been no previously known systems which accurately and rapidly diagnose the real-time wind flow, along with the range and spread of airborne hazards over an area of interest using locally available sensor and computational resources. As such, the steps taken by emergency personnel to protect soldiers and/or civilians during the release of an airborne hazard have proven inadequate.

SUMMARY OF THE PRESENT INVENTION

The present invention provides a system to rapidly assess the spread of airborne hazards which overcomes the above-mentioned disadvantages of the previously known methods used to predict the spread of airborne hazards.

In brief, the system includes at least one, and preferably numerous spaced apart sensor modules which are distributed through an area of interest. These sensor modules sense a plurality of weather conditions including barometric pressure, temperature, humidity, wind speed, and wind direction. Since the sensor modules are positioned throughout the area of interest, the sensor modules provide essentially a real time output signal of the atmospheric conditions in the area of interest.

The sensor outputs are connected through a network as input signals to a model module. The model module rapidly calculates a projected wind flow over the area of interest on a 24/7 basis, as well as the impact of that wind flow on a plume, if present. Different model modules, such as the 3DWF wind flow model developed by the Army Research Laboratory (ARL), and/or the toxic plume ALOHA model developed by NOAA, may be utilized.

The model module then generates a data stream to a display module which visually displays not only the area of interest, but also the wind flow conditions over that area of interest and the effect of the wind flow on a toxic plume, if present. An end user receiving the L-REAC™ System output, or a L-REAC™ System operator at the display module is then able to deploy emergency personnel and/or equipment necessary to address the emergency condition.

In addition to the sensor, model, and display modules, the system also preferably includes a quality control and archive modules that, respectively, review live and stored sensor data, and periodically (e.g., once a day) store the sensor data in a time-tagged archive. The data quality control module thus enables, if required, an audit of live or archived sensor module data, or review of meteorological trends that affect model module calculations of wind flow patterns and hazardous plume behavior. The system operator also has the option of archiving images sent out to end users during an incident.

BRIEF DESCRIPTION OF THE DRAWING

A better understanding of the present invention will be had upon reference to the following detailed description when read in conjunction with the accompanying drawings, wherein like reference characters refer to like parts throughout the several views, and in which.

DETAILED DESCRIPTION OF A PREFERRED EMBODIMENT OF THE PRESENT INVENTION

Figure 1:
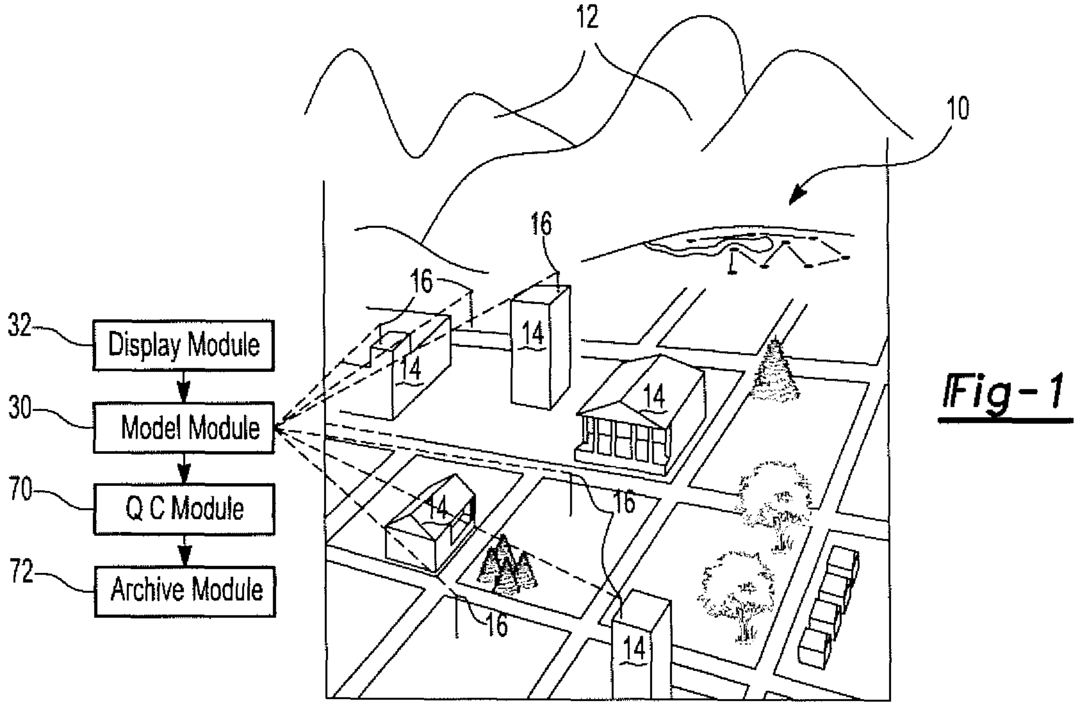
FIG. 1 is a diagrammatic view illustrating a preferred embodiment of the invention.

With reference first to FIG. 1, an exemplary area of interest 10 is illustrated. This area of interest 10 may include irregular terrain, such as mountains 12, and/or other structures, such as buildings 14.

A plurality of weather sensors 16 are sparsely distributed through the area of interest 10. Each sensor module 16 detects and generates an output signal representative of at least the weather parameters needed as input to the wind and plume models.

Figure 2:
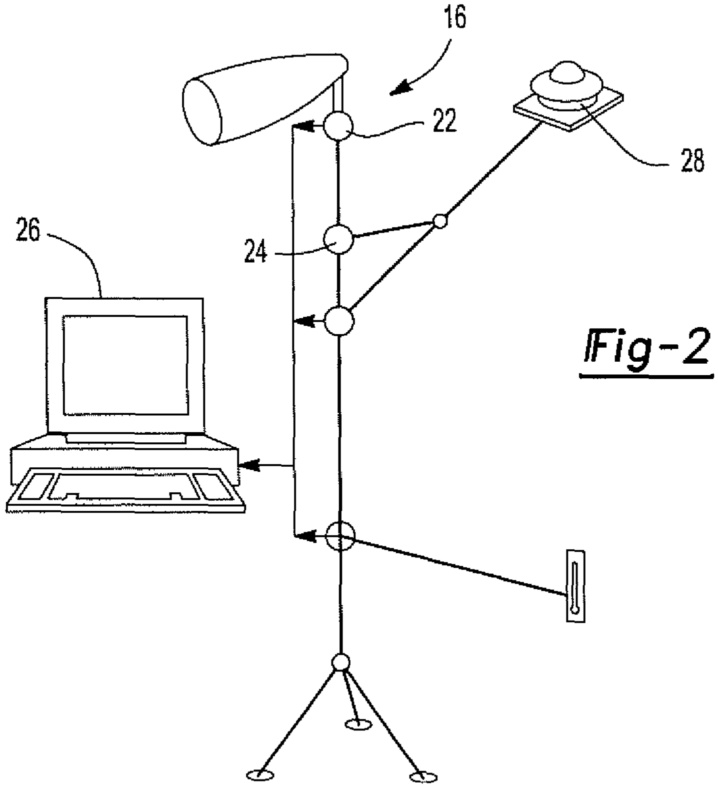
FIG. 2 is an elevational view of an exemplary sensor module.

An exemplary sensor module 16 is illustrated in FIG. 2 and includes a wind monitor 20 which detects both wind direction and wind speed. For the fixed site, dedicated sensor, this monitor is an animated wind sensor. For mobile or multiple sensor locations, this animated characteristic does not apply. The sensor module 16 also includes a temperature sensor 22 (at least one), a humidity sensor 24, a barometric pressure sensor 26, and a pyranometer 28. The sensor module 16 thus generates real time atmospheric data at the position of the sensor module 16.

All of the sensor modules 16 periodically transmit their atmospheric data as input signals to a model module 30 (FIG. 1). Any conventional means may be used to transmit the atmosphere information from the sensor modules 16 to the model module 30, such as hard wire, the Internet, other networks, or even wirelessly. Preferably, the model module reads the output data from the sensor modules 16 on a periodic basis, e.g. once per minute. Consequently, the atmospheric data provided to the model module 13 is essentially real time data.

The model module is programmed to calculate the wind flow over the area of interest 10 based upon the input signals from the sensor modules 16. Any appropriate model module 30 may be used for the wind and plume models, such as the 3DWF wind model from ARL or the toxic plume ALOHA model from NOAA. Other model modules, however, may be more appropriate for different areas of interest 10 and applications.

Once the model module has determined the calculated wind flow over the area of interest 10, the model module outputs a signal to a display module 32 which displays the wind flow over the area of interest and, optionally, its effect on a toxic plume if present. The display module itself may be of any conventional construction, such as a CRT display, an LCD display, a plasma display, and/or the like.

Figure 3:
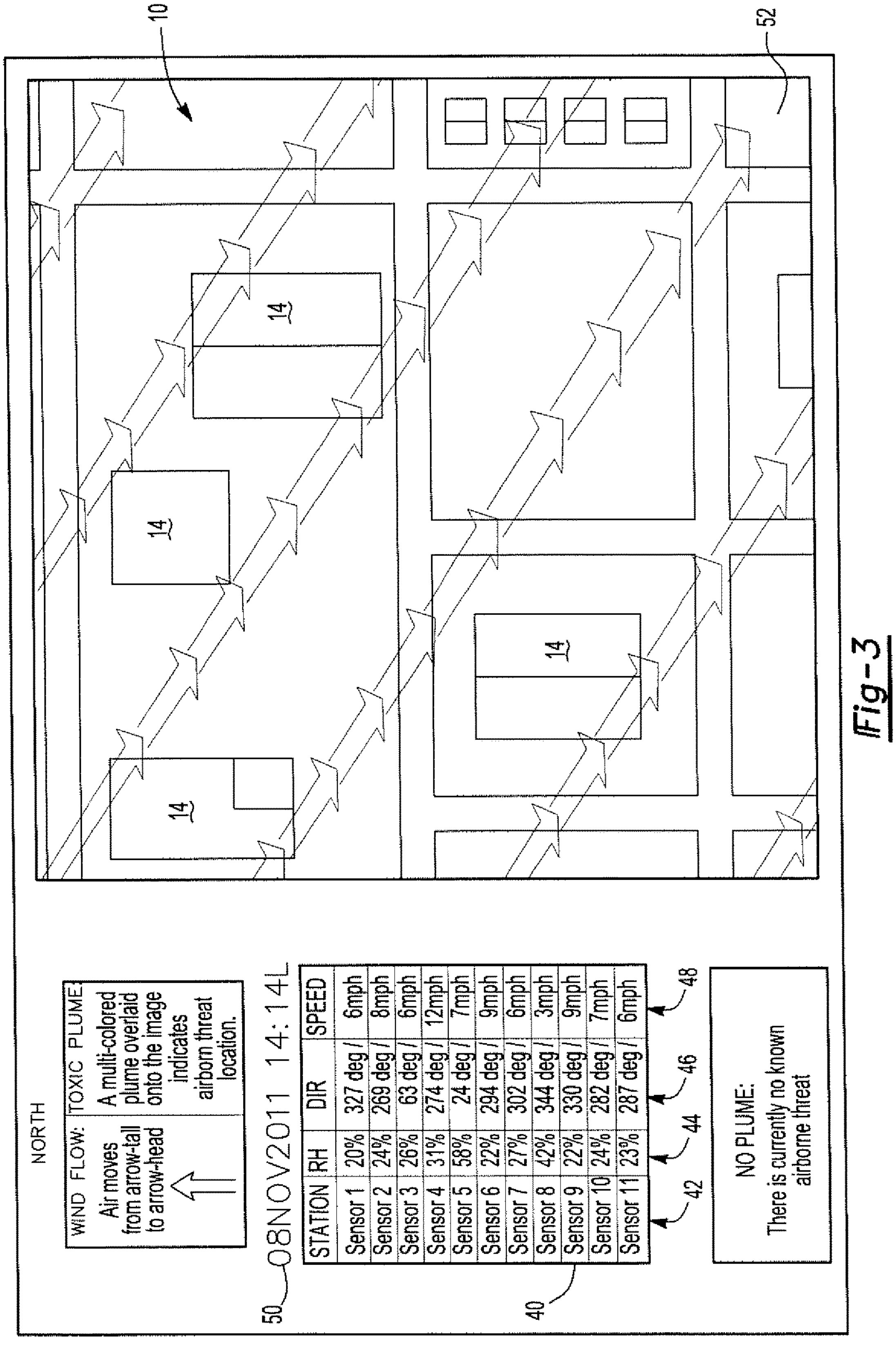
FIG. 3 is a view of an exemplary aerial view of an area of interest without an airborne hazard.

With reference now to FIG. 3, an exemplary display on the display module 32 is illustrated. The display includes a first display area 40 which displays all of the time-qualified sensors 16 in a first column 42. To satisfy the First Responder applications, the relative humidity for each sensor module is then shown in a second column 44 while the wind direction and wind speed are shown in columns 46 and 48, respectively. The parameter units displayed align with their application usages. The display area 40 also includes a time stamp 50 (in local time) which continuously updates with each new data entry display. Other acquired sensor data can be added to this display list.

In a second display area 52, an aerial image of the area of interest 10, in this case including a number of buildings 14, is shown. Small arrows and streamlines 54 are superimposed over the area of interest 10 illustrating the measured and modeled wind flow and direction over the area of interest 10.

Figure 4:
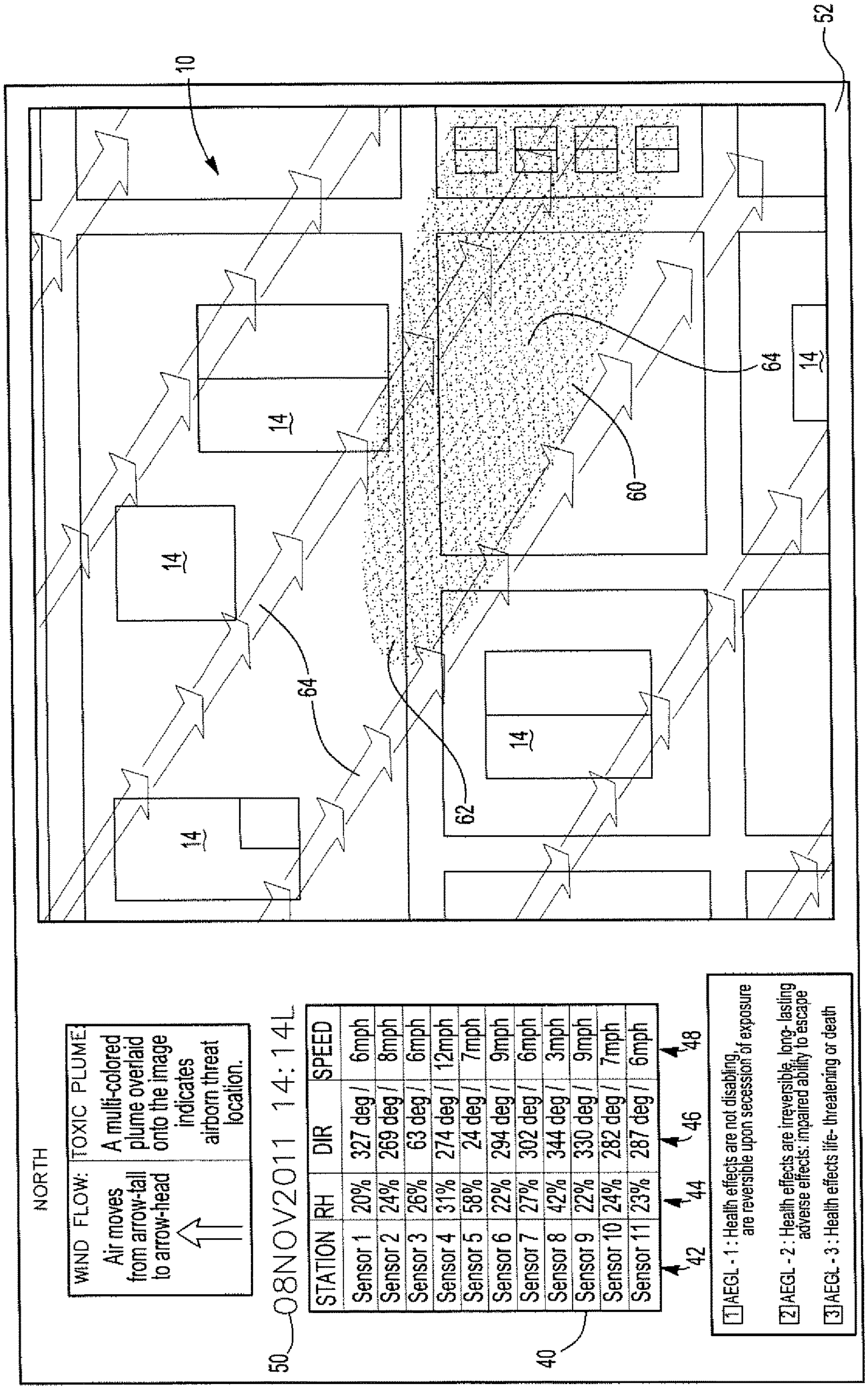
FIG. 4 is a view of an exemplary aerial view of an area of interest with an airborne hazard.

The area of interest 10 illustrated in FIG. 3 does not contain an airborne threat of hazardous material. However, as shown in FIG. 4, a plume 60 of a hazardous material is shown emanating from a position 62 in the area of interest 10. The wind flow conditions in the area of interest 10 affect both the direction of the plume 60 as well as the plume concentrations 60, as they impact human life. For example, a central portion 64 of the plume 60 may be one color, e.g. red, which would indicate that the toxic plume 60 is present in lethal doses. Conversely, an outer region 66 around the red portion may be differently colored, e.g. orange and yellow, indicating that the plume 60 is not lethal in that area, but that personnel in that area may require assistance to evacuate. Areas outside the yellow area 66 may be yet a different color, or clear, which is indicative that that area is relatively safe for personnel.

Still referring to FIG. 4, the display on the display module 32 is periodically updated, e.g. once per minute, so that the areas immediately affected by toxic plume 60 vary according to the changing winds. Furthermore, any wind and plume models, such as the 3DWF and the ALOHA model, respectively, may be used by the model module 30 (FIG. 1) to calculate and project the spread of the toxic plume 60.

Figure 5:
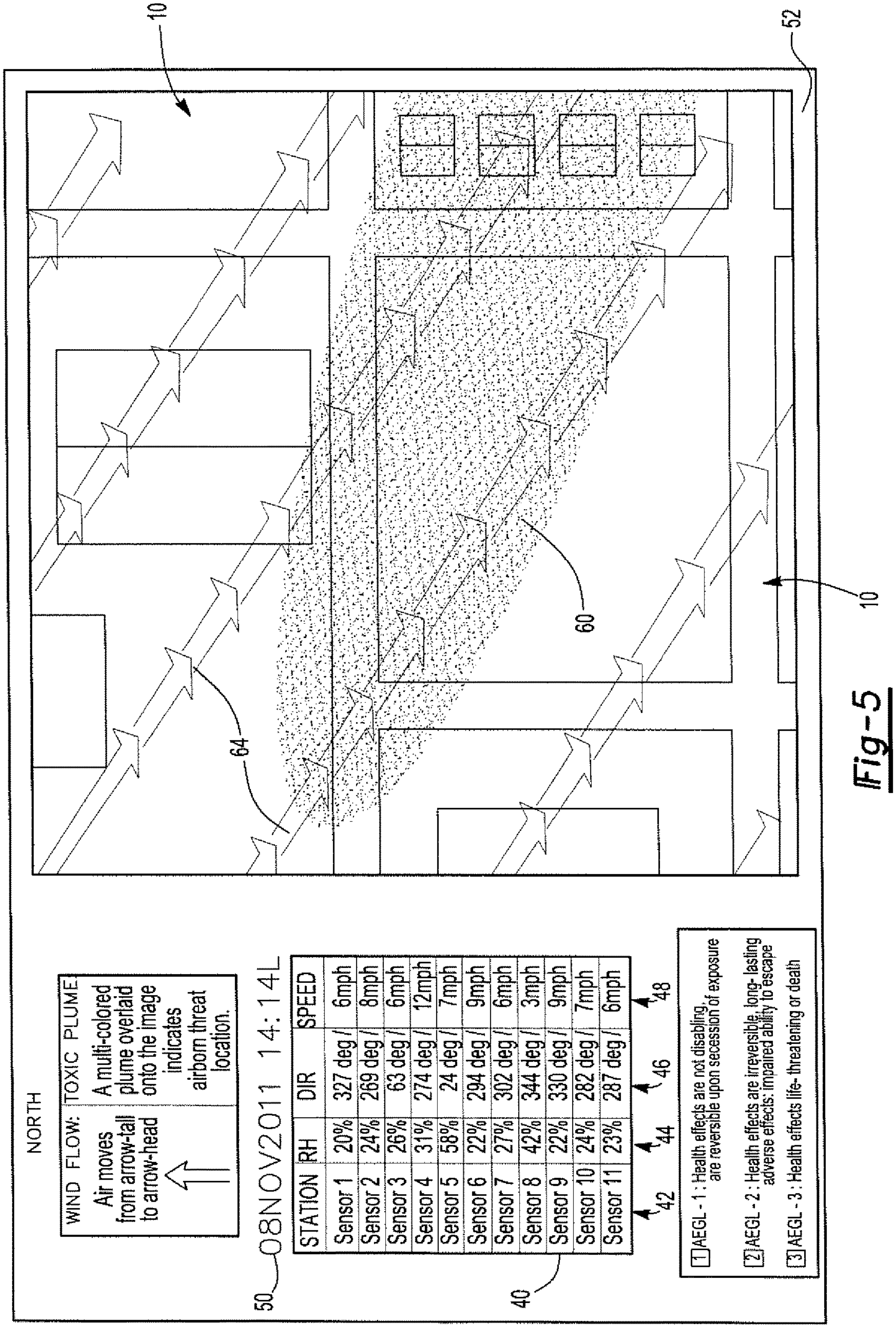
FIG. 5 is a zoom view illustrating a portion of FIG. 4.

With reference now to FIG. 5, the display module 32 also includes the capability to move around to different parts of the area of interest 10. In addition, as shown in FIG. 5, the display module 32 is capable of zooming in, as well as zooming out of various selected portions of the area of interest 10. As shown in FIG. 5, the area of interest 10 is more zoomed in, or enlarged, relative to the display shown in FIG. 4.

With reference again to FIG. 1, in the preferred embodiment of the invention, the overall system includes a quality control module 70 which periodically receives logged data from the sensor module 16. The logged sensor module 16 data that are reviewed by the quality control module 70 are then periodically stored in disk files by the archive module 72. The quality control module 70 enables examination of (1) the integrity of live data passed from the sensor module 16 to the model module 30 or of (2) historical sensor data stored by the archive module 72. The accuracy and reliability of model module 30 results that are passed to the display module 32 may therefore be estimated for after-action analysis or improvement of model module 30. The quality control module 70 and archive module 72 enable a real-time visual check of the incoming sensor information and subsequent comparison of the calculated wind flow data and actual wind flow data which, in turn, may be used for flagging subsequent sensor malfunctions and/or improvements on the model module 30.

From the foregoing, it can be seen that the present invention provides an effective system to evaluate and depict airborne hazards in an emergency situation. Having described our invention, however, many modifications thereto will become apparent to those skilled in the art to which it pertains without deviation from the spirit of the invention as defined by the scope of the appended claims.

NUMBER KEY

10 area of interest
12 mountains
14 buildings
16 atmospheric sensor module
20 wind monitor
22 temperature sensor
24 humidity sensor
26 barometric pressure sensor
28 pyranometer
30 model module
32 end user display module
40 first display area
42 first column
44 second column
46 column
48 column
52 second display area
54 arrows
60 plume
62 position
64 central portion
66 outer region
70 quality control module
72 archive module

We claim:

1. A system to evaluate airborne hazards comprising:

at least one sensor module which detects at least one including but not limited to, wind direction, wind speed, humidity, and temperature and generates a plurality of spaced apart sensor modules output signal representative of at least one atmospheric condition at said sensor location, a model module which receives the sensor module output signal and periodically generates a model output signal representative of a calculated plume over an area of interest, and a display module which receives said model output signal and visually displays the calculated wind flow over the area of interest said sensor module positioned at average height of a human beings head at a sensor location and further comprising a quality control module that periodically receives and plots measured meteorological data within the area of interest and an archive module that receives logged meteorological data and stores those data in time-stamped archive file for later analysis by the quality control module said display module depicts wind direction by displaying at least one arrow corresponding to the wind direction and in which the length of the arrow corresponds to wind speed wherein a set of parameter units displayed align with their application usages.

* * * * *